United States Patent [19]

Dow

[11] Patent Number: 5,118,222
[45] Date of Patent: Jun. 2, 1992

[54] METHOD AND APPARATUS FOR CONSTRUCTING SEAWALLS AND DOCKS

[76] Inventor: John M. Dow, 48 Edward Laurier Drive, Halifax, Nova Scotia, Canada, B3M 2C7

[21] Appl. No.: 690,650

[22] Filed: Apr. 24, 1991

Related U.S. Application Data

[63] Continuation-in-part of Ser. No. 587,985, Sep. 25, 1990, abandoned.

[51] Int. Cl.$^5$ .......................... E02B 3/04; E02D 23/02
[52] U.S. Cl. ..................................... 405/262; 405/204; 405/284
[58] Field of Search ............... 405/262, 284, 285, 286, 405/258, 116, 110, 107, 11-14, 203, 204, 207, 223, 209

[56] References Cited

U.S. PATENT DOCUMENTS

| | | | |
|---|---|---|---|
| 782,557 | 2/1905 | Hadlock et al. | 405/207 |
| 1,294,556 | 2/1919 | Spelman | 405/286 |
| 1,310,461 | 7/1919 | Williams | 405/204 |
| 2,029,004 | 1/1936 | Varni | 405/223 X |
| 2,050,727 | 8/1936 | Misz | 405/223 X |
| 4,440,527 | 4/1984 | Vidal | 405/262 X |
| 4,564,316 | 1/1986 | Hunziker | 405/262 |
| 4,659,252 | 4/1987 | Sexton et al. | 405/116 X |
| 4,729,692 | 3/1988 | Tucker | 405/116 X |
| 4,790,690 | 12/1988 | Vidal et al. | 405/262 |
| 4,869,620 | 9/1989 | Dow | 405/204 X |

*Primary Examiner*—Dennis L. Taylor

[57] ABSTRACT

Method and apparatus for making a dock or seawall. A forming float device, comprising a forming deck and ballasting means therebelow, floats in a body of water a selected distance from the shoreline. A first wall section is formed on the top surface of the forming deck, such that the first wall section rests horizontally on the surface of the deck, and comprises a plurality of wall pieces whereby the wall pieces are aligned and shaped appropriately to together provide a uniform wall. Each wall piece is fastened by fastening means to the top surface of the forming deck. Earth reinforcing strips are installed in each wall piece such that the earth reinforcing strips extend upwardly from the wall pieces generally perpendicular to the planes defined by the wall section and forming deck and the earth reinforcing strips are secured in that upward position. Alternatively, a bundle of cylindrical containers may be attached together and to the wall section. The forming float device is rotated 90° by means of ballasting means so that the wall section assumes a generally perpendicular position and the wall section is then rested on a pre-selected location of the floor of the body of water. Backfill is placed between the shoreline and the wall section such that the earth reinforcing strips and wall pieces are made to stabilize and maintain position. (Or, if cylinders are used, backfill is placed in and around the cylinders.) The forming float device is then freed from the wall section by unfastening the fastening means. Finally, the forming float device is rotated to its original orientation and refloated to the surface of the water by means of the ballasting means. The foregoing steps are repeated for each successive wall section to comprise the dock or sea wall and each successive wall section is positioned on the floor of the body of water adjacent to the previously placed section.

22 Claims, 12 Drawing Sheets

METHOD AND APPARATUS FOR CONSTRUCTING SEAWALLS AND DOCKS

RELATED APPLICATION

This application is a continuation-in-part of U.S. application Ser. No. 07/587,985 filed Sep. 25, 1990, now abandoned.

FIELD OF THE INVENTION

The present invention relates to apparatus for and a method of building a dock or seawall comprised of a plurality of wall sections. More particularly, this invention is concerned with apparatus for and a method of building a dock using earth reinforcing strips attached to a plurality of wall panels or pieces which together form a wall section and vertically positioning those wall pieces in the water using a forming float device with ballasting means.

BACKGROUND

The dock walls to which the invention pertains are of the type constructed by Reinforced Earth Company Ltd. and known as Reinforced Earth (Trade-mark) wall structures. These structures are comprised of a plurality of wall panels (pieces). For seawalls they are typically rectangular in shape and about 12 ft. in length and 6' high, with a plurality of earth reinforcing strips installed in and extending perpendicularly from each panel. To form a wall structure using these panels a single row of such panels are positioned on the ground, and backfill is placed behind the panels to surround and cover the earth reinforcing strips. The friction between the earth reinforcing strips and the backfill creates a tensile force on them which holds the wall panels in position; some stabilization of the panels is necessary during the tensioning of the earth reinforcing strips and, consequently, the panels must be free to move, to a limited extent, along the directional line of the earth reinforcing strips during the stabilization period. Additional layers of panels are then installed, one layer over the other, in like manner to the foregoing until the desired wall height has been accomplished. However, for the construction of such walls in the water to form docks or seawalls this method is expensive, complex and, in the case of high walls not practically workable (since, by the foregoing method used for land, single layers of relatively low height are installed separately, one after the other).

The present invention provides a new approach to building such docks and seawall structures, using the Reinforced Earth (Trade-mark) method of wall retention, which simplifies and reduces construction costs and enables the construction of greater wall heights.

SUMMARY OF THE INVENTION

In accordance with the invention, there is provided a method of making a dock or sea wall using a forming float device comprising a forming deck and ballasting means therebelow. The device is floated in a body of water a selected distance from the shoreline. A wall section is formed on the top surface of the forming deck such that the wall section rests horizontally on the surface of the deck. The wall section is shaped so as to provide a horizontal bottom surface. The side surfaces of the first wall section may be vertical or sloping; in the case of sloping side surfaces the side to be positioned closest to the direction of construction slopes downwardly in the direction of construction and the opposite side slopes upwardly in the direction of construction (e.g. a triangular shape), the angle of the sloping being predetermined in relation to the angle of repose of backfill to be placed between the wall section (when finally positioned) and the shoreline (preferably a slope of 1½ units horizontal to 1 unit vertical). Each wall section comprises a plurality of wall pieces whereby the wall pieces are aligned and shaped appropriately to together provide a uniform wall and each wall piece is fastened by fastening means to the top surface of the forming deck in such manner as to permit limited movement of the wall pieces in a plane perpendicular to the plane of the forming deck and such that the fasteners may be removed remote from the top surface of the forming deck.

Earth reinforcing strips are installed in each wall piece whereby the earth reinforcing strips extend upwardly from the wall pieces generally perpendicular to the planes defined by the wall section and forming deck, the length of the earth reinforcing strips having been appropriately selected according to the height of the dock or sea wall being made. The earth reinforcing strips are secured in the upward generally perpendicular position. When the wall section is completed with all the wall pieces installed and fastened on the forming deck and the earth reinforcing strips installed and secured (e.g. by means of wires fastening the upper ends of the strips to horizontal cables suspended from masts mounted on the float or, alternatively, by means of a wire mesh cage formed around and attached to the strips), the forming float is then moved or towed to the location where the seawall or dock is to be constructed. The forming float device is rotated by ballasting means (i.e. by flooding floats on the side of the base of the wall section) whereby, the wall section assumes a generally perpendicular position. The forming float device is positioned such that the generally perpendicular wall section and the forming float rests on a pre-selected location of the floor of the body of water. Backfill is placed between the shoreline and the wall section such that the earth reinforcing strips and wall pieces are made to stabilize and maintain position. The forming float device is removed from the wall section, rotated to its original orientation and refloated to the surface of the water by means of ballasting (i.e. by pumping water from the flooded floats).

The foregoing steps are repeated for successive wall sections to comprise the dock or sea wall. Each successive wall section may be shaped to provide vertical side surfaces or, alternatively, sloping side surfaces as necessary to mate with the side surfaces of the adjacent wall section; in the case of sloping side surfaces both of the side surfaces slope downwardly in the direction of construction (i.e. the side surfaces are parallel) at the same angle as the side of the first wall section which is closest to the direction of construction. Each successive wall section is positioned on the floor of the body of water adjacent to the previously placed section in the direction of construction and, in the case of sections having sloping sides, the downwardly sloping side (i.e. the upperside) of the previously placed section is aligned with the downwardly sloping side (i.e. the underside) of the successive wall section which is opposite the direction of construction.

Preferably, a mattress is placed on the floor of the body of water and the wall section is positioned over and made to rest on the mattress.

Also in accordance with the invention, there is provided an apparatus for making a dock or sea wall comprising a forming float device which is floatable on a body of water. A forming deck provides a generally horizontal surface for forming and holding thereupon a wall section comprised of a plurality of wall pieces. Fastening means is provided for fastening a plurality of wall pieces to the top surface of the forming deck in such manner as to permit limited movement of the wall pieces in a plane perpendicular to the plane of the forming deck and such that the fasteners may be removed remote from the top surface of the forming deck. Securing means secures earth reinforcing strips installed in the wall pieces in an upward, generally perpendicular, position relative to the forming deck. Rotating means is provided for rotating the forming float device approximately 90 degrees. Positioning means is provided for positioning the forming float device over or on a preselected location of the floor of the body of water. Refloating means is provided for refloating the forming float device on the body of water. Preferably the means for rotating, positioning and refloating the forming float device comprises means for ballasting (i.e. for flooding the floats of the forming float device with water and for, instead, pumping water out of the floats). The securing means may comprise a plurality of holding masts at opposite sides of the forming deck and perpendicular to it, such that the masts are rotated to a horizontal position above and below the earth reinforcing strips upon a 90° rotation of the forming float device. The securing means may, alternatively, comprise a plurality of false wall sections, forming a cage, around and attached to the strips.

According to another aspect of the invention a bundle of containers attached to, and on top of, the wall section are used to secure the wall section in its final vertical position instead of reinforcing strips. The longitudinal axes of cylindrical containers, preferably four bundled together, are parallel to the wall section. After the forming float device and wall section thereon are rotated to a vertical position and placed on the floor (of the water), backfill is placed into and around the cylindrical containers.

BRIEF DESCRIPTION OF THE DRAWINGS

A more detailed description of the invention is described below (under the following heading) with reference to the following drawings in which like numerals refer to like elements throughout.

DETAILED DESCRIPTION OF FIRST, SECOND AND THIRD EMBODIMENTS OF THE INVENTION

FIRST EMBODIMENT (FIGS. 1 TO 9)

Figure 1:
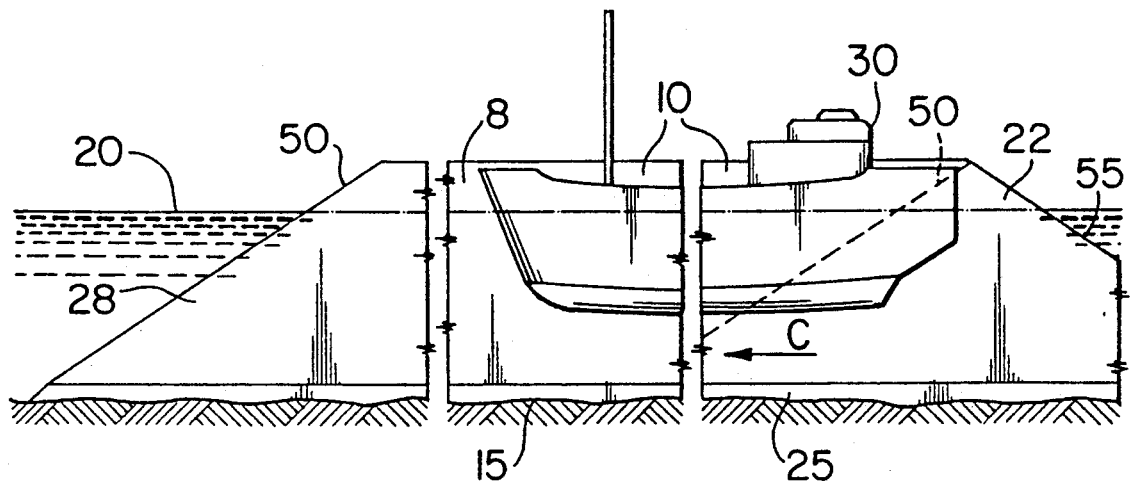
FIGS. 1 and 2 are front and cross-sectional side views of a dock wall which has been constructed in accordance with one embodiment of the invention (and also illustrate a mattress below the wall, a ship adjacent the water-side of the wall and, in FIG. 2, a platform created by fill material placed behind the wall)
Figure 2:
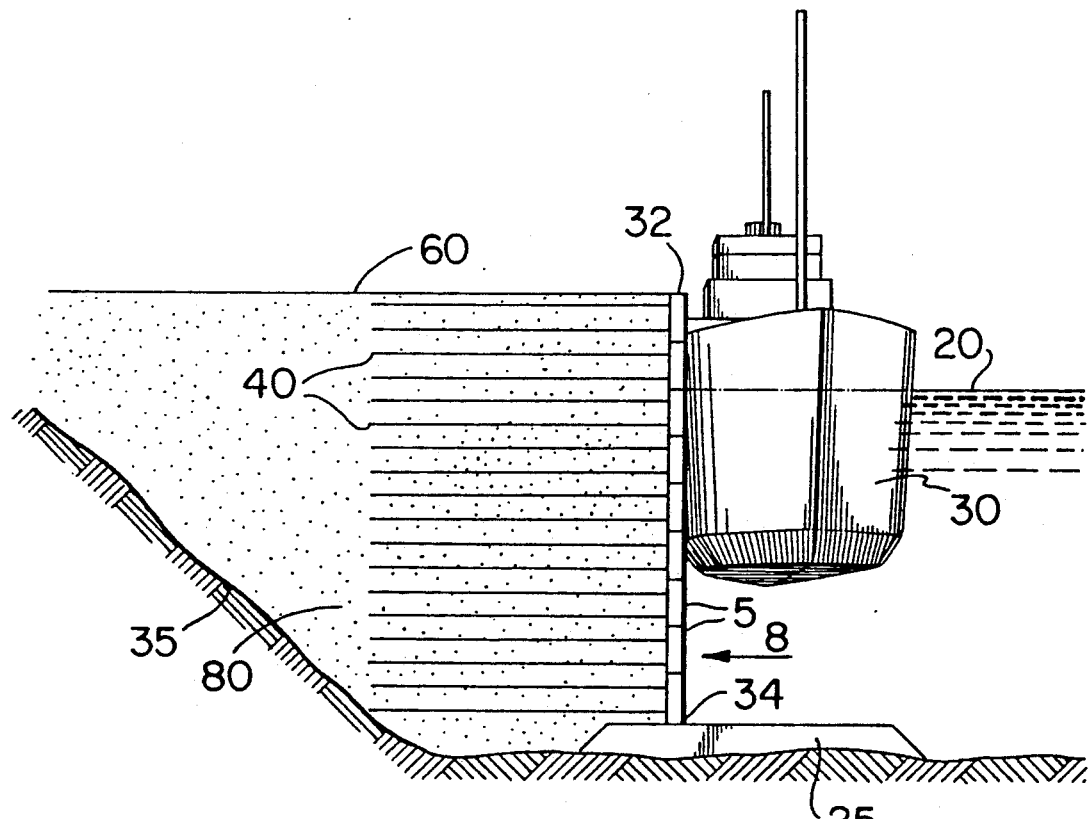

FIGS. 1 and 2 illustrate front and cross-section views, respectively, of a dock or seawall 8 constructed in accordance with one embodiment of the invention. The water line 20 and a boat 30 are shown for purposes of illustration. The wall is comprised of a plurality of wall sections 10, 22, 28 positioned side by side and joining each other along the sides 50. The wall 8 rests on a mattress 25 which is positioned on the floor 15 of the body of water. Each wall section 10, 22, 28 is comprised of a plurality of precast concrete wall pieces (panels) 5 which are aligned and shaped appropriately so as to together provide a uniform wall section. (Below, a second embodiment of the invention is described with reference to FIGS. 10 to 23, whereby rectangular-shaped wall sections 300 are used to advantage rather than the sloped-side sections 10, 22, 28.) Installed in each wall piece 5, and extending perpendicularly therefrom, are steel earth reinforcing strips 40. Backfill 80 surrounds the earth reinforcing strips 40 so as to maintain the wall pieces 5 in position and join the shoreline 35 to the wall 8. A dock platform 60 is thereby created adjacent the wall 8.

Figure 3:
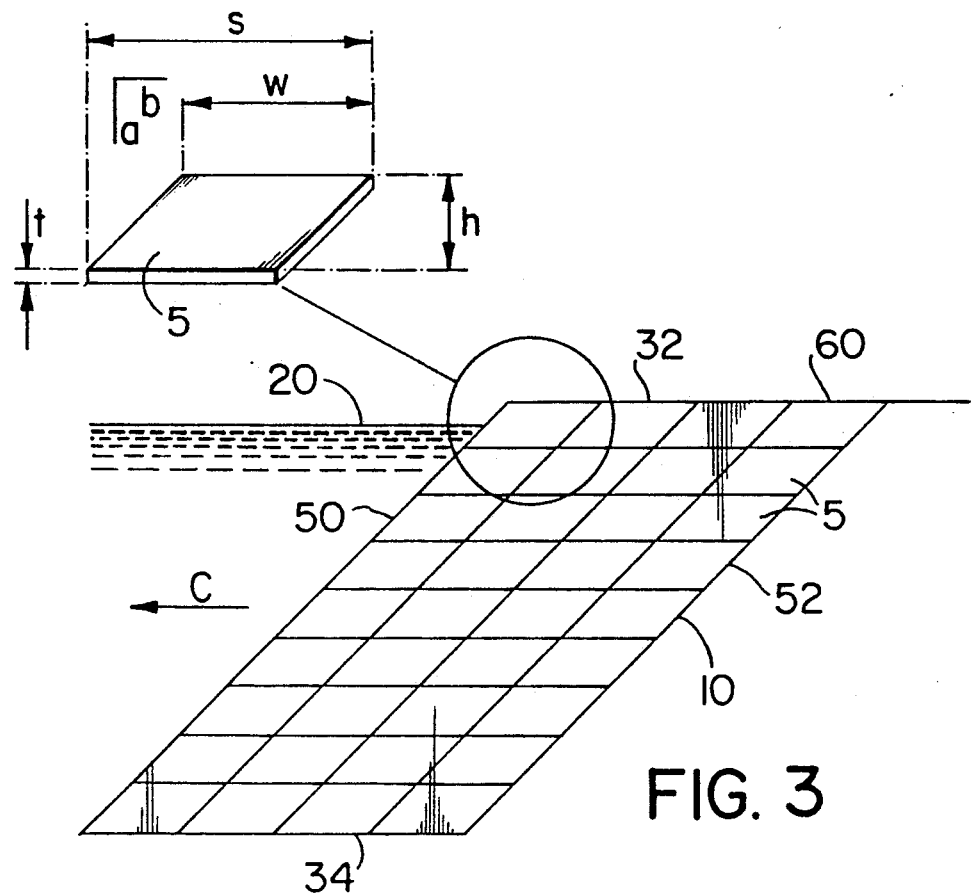
FIG. 3 is a front view of a section of a dock wall in accordance with one embodiment of the invention.

In FIG. 1, the first wall section 22 is triangular in shape (shown by edge 55 and hidden edge 50) and differs from the shape of the remaining wall sections 10, 28 which are as shown in FIG. 3. This special starting section 22 is used by reason of the necessity to accommodate the natural movement and angle of repose of backfill behind the wall sections. (However, this is not a factor which applies to the second embodiment of the invention described below as, in that embodiment, the reinforcing strips and backfill are contained within a plurality of false wall sections and wires therebetween and, therefore, the backfill is not free to settle beyond the vertical side bounds of the wall section.) The sides 50, 55 of wall section 22 are sloped units to the horizontal and 1 unit to the vertical but unlike sections 10, 28 the sides are not parallel and the edge 55 furthest from the direction of construction (C) slopes upwardly in the direction of construction. The triangular shape therefore enables the natural settlement of landfill behind section 22 and also enables the alignment of the first section 22 to a successive wall section 10 at edge 50.

As shown by FIG. 3, the successive wall sections 10, 28 are of a trapezoidal shape with a horizontal top and bottom 32, 34 and parallel, angled sides 50, 52. The sides 50, 52 are sloped 1½ units to the horizontal and 1 unit to the vertical and, therefore, edges 52 of wall sections 10, 28 are able to align with the edges 50 of the successive wall sections 10, 28. The placement of each successive wall section 10, 28 after the first wall section 22 is in the line of construction (C).

Each wall section 10, 28 is comprised of a plurality of precast concrete wall pieces 5 which are aligned to produce a uniform wall section. In the embodiment illustrated the wall pieces 5 are trapezoidal according to the wall sections 10, 28 and are arranged in 9 rows of 4 pieces (36 wall pieces in total). Each concrete wall piece 5 is 7' in height (h), 8" thick (t), 12' in width (w) and 22½' in over all length (s). Thus, each wall section 10, 28 is 63' high, 50' wide and 8" thick. Twenty of these wall sections are aligned together, with a special starting section such as section 22, to produce a seawall 8 having a length of 1000 feet. The foregoing dimensions of the pieces, the illustrated configuration of 36 pieces, and the resulting wall section height of 63' are provided by way of example only. Wall heights and lengths of any practical dimension may be constructed of pieces of various shapes and dimensions using the method claimed herein.

Figure 4:
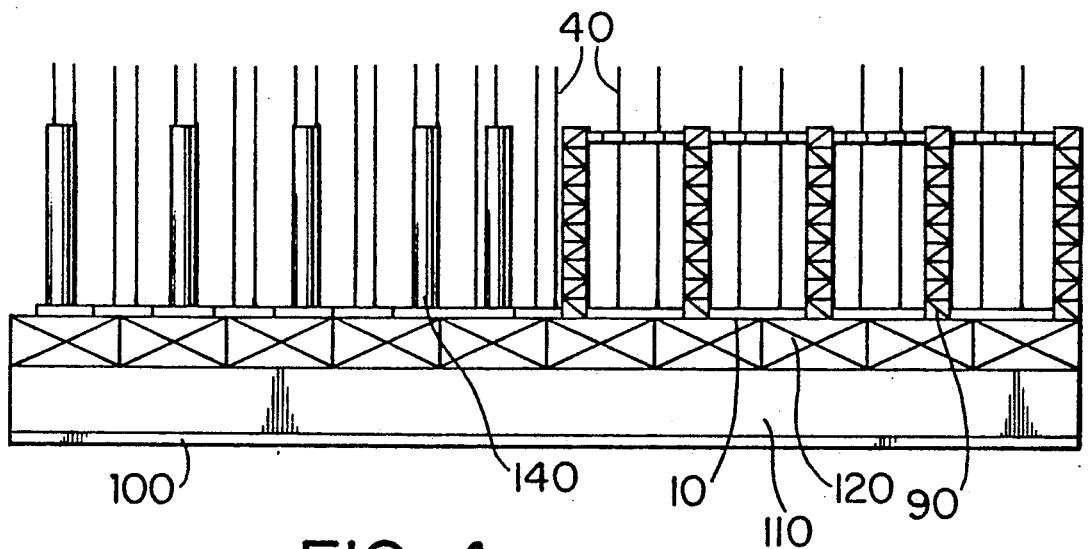
FIG. 4 is a side view of a forming float device according to one embodiment of the invention (also illustrating thereon a section of a dock wall)
Figure 5:
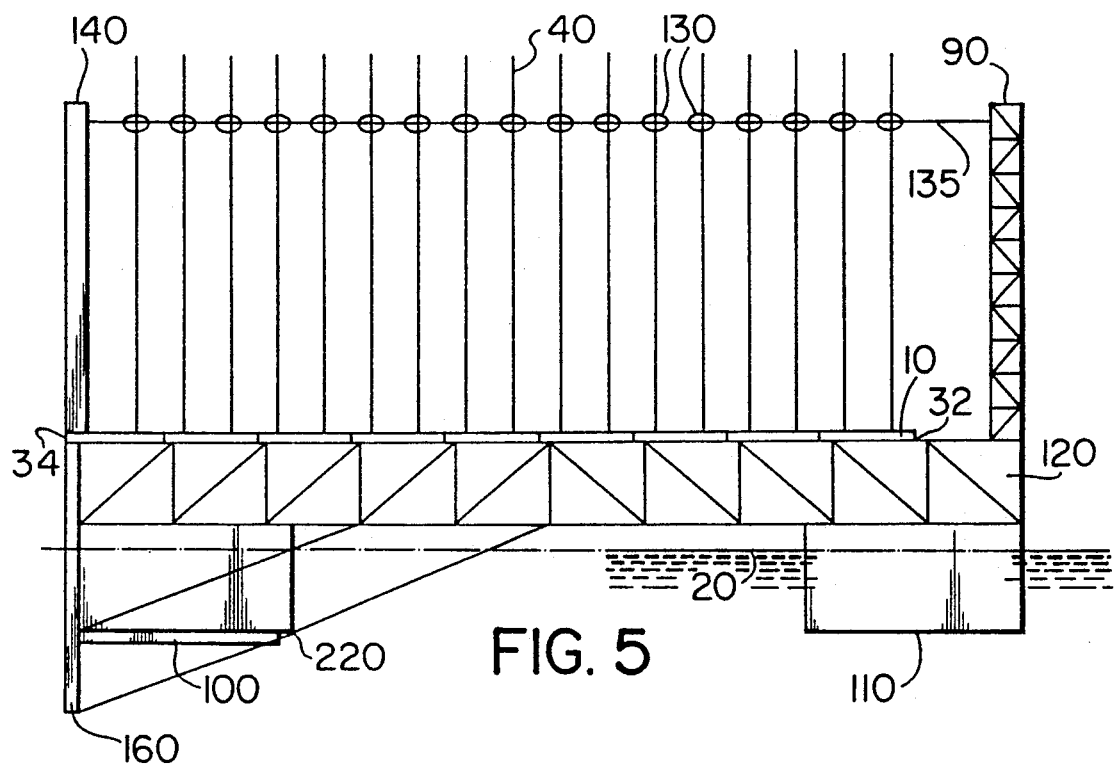
FIG. 5 is an end view of the forming float device according to one embodiment of the invention.

FIGS. 4 and 5 illustrate the side and end views, respectively, of a float device according to this embodiment upon which the wall sections 10, 22 and 28 are formed. A floatable rectangular forming deck 120 provides a horizontal surface (platform) for positioning the wall pieces 5 which comprise each wall section (see FIG. 6). Top float 110 and counterweight 100 provide means for ballasting, trimming, rotating and manoeuvring the forming float device according to conventional design. The counterweight 100 of the forming float is located along and behind the top 200 of the forming deck which is adjacent and parallel to the top 32 of the wall sections 10, 28. The top float 110 is located adjacent to the top 200 of the forming deck and below and behind it. The bottom 210 of the forming deck is parallel to the bottom 34 of the wall sections 10, 28 and coincides with it. Bottom float 220 is located adjacent to the bottom 210 of the forming deck and below and behind it. The side of bottom float 220 perpendicular to the bottom 210 of the forming deck has a foot 160 built into it, being a structural member, which serves to carry the weight of the forming float device when it has been rotated and is resting on the mattress 25. The wall section 10, 28 is positioned on the forming float device so that when the forming float device has been rotated by ballasting means, positioned over the mattress in its proper vertical position and alignment and floats 110 and 220 have been sufficiently flooded to have caused the forming float device to firmly rest on mattress 25 supported by foot 160, the bottom edge 34 of each wall section 10, 28 also lies directly on the mattress 25. Earth reinforcing strips 40 extend perpendicularly from the wall section 10 and are secured in that position by permanent and disposable masts 90, 140, steel lines 135 strung between the earth reinforcing strips 40 and masts 90, 140 and steel ties 130 around the earth reinforcing strips 40 and attached to lines 135.

Figure 6:
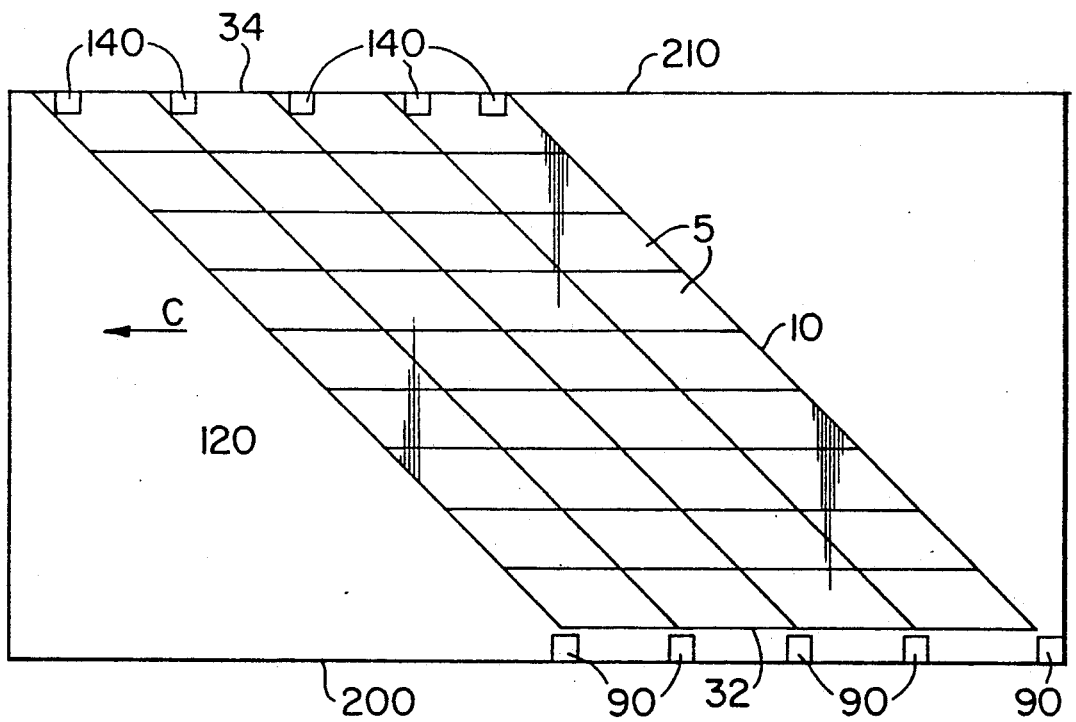
FIG. 6 is a top view of a forming float device according to one embodiment of the invention showing the placement of a section of a dock wall.

FIG. 7 (7a, 7b, 7c, 7d) illustrates the method of installing a wall section 10, 22, 28 according to this embodiment. The forming float device is floated in a body of water a selected distance from the shoreline, the selection being made according to convenience for the construction operations of placing the wall pieces and earth reinforcing strips both of which are prefabricated in plants located remote from the work site. The wall pieces 5 are positioned on the forming deck 120 as shown in FIG. 6. Each wall piece 5 is then fastened to the deck 120 by conventional fastening means in such a manner as to permit limited movement (e.g. ½ inch) of the wall piece 5 towards the deck 120 (i.e. in a plane perpendicular to the plane of the forming deck). This movement is necessary to enable the wall piece and attached rod to come to a stabilized position when the backfill is placed behind the wall section. The fastening means is also such as to permit its removal remote from the top surface of the forming deck. The earth reinforcing strips 40 (such as those used for Reinforced Earth (Trade-mark) technology) are then installed in the wall pieces 5 as shown, the length of the earth reinforcing strips being about 0.70 times the height of the finished wall. The earth reinforcing strips 40 extend upwardly from the deck 120 and are secured in position by means of the steel line 135 and ties 130 around the earth reinforcing strips, the steel line 135 being anchored by the steel masts 90, 140 (see FIG. 7a). Alternately the earth reinforcing strips can be fastened to additional adjacent bars. located vertically, horizontally, and diagonally, so as to render the earth reinforcing strips self supporting in their initial vertical position and in their final horizontal position.

Following the preparation of the wall section 10 on the forming deck 120 the float device is moved or towed to the location where the seawall or dock is to be constructed. The float device is then rotated (R) towards the shoreline 35 as shown so that the wall section 10 assumes a perpendicular position over the floor 15 of the body of water (see FIGS. 7b, 7c). This is accomplished by flooding the bottom float 220 so as to cause it to sink and the forming float device to rotate and come to rest in a vertical position (the buoyancy of the top float 110 also being appropriate for this result). When in this position the weight of the earth reinforcing strips 40 is held by mast 90. The rotation of the device is controlled by the ballasting means comprising floats 110, 220 and counterweight 100 which are configured and operated according to conventional designs as are well known in the art. The counterweight 100 is necessary as a stabilizing and trimming device of the forming float. This is due to the weight of the forming deck, concrete pieces, reinforcing earth strips, steel masts, fastening devices, etc., all of which are located more to one side of the device and move the centre of gravity of the forming float to the shore side when it has been rotated to the vertical position. The counterweight 100 is located on the opposite side of the centre of gravity and is of such a size as to bring the centre of gravity of the forming float in coincidence with the centre of buoyancy of the forming float device, when in the vertical position, so that it floats in a truly vertical direction before it is positioned on the mattress. Prior to this the sea bottom in the location where the sea wall or dock is to be constructed is prepared and leveled by dredging if necessary, and by constructing, underwater, a level surface or a mattress consisting of crushed stone which is placed conventionally by means of dump scows, clamshells, and levelling devices. The mattress provides a uniform horizontal surface on the sea bed along the line of the sea wall or dock face on which the wall sections rest. The mattress is of such a size as to accommodate the wall section as well as the foot of the forming float that is perpendicular to the forming deck.

Figure 7A:
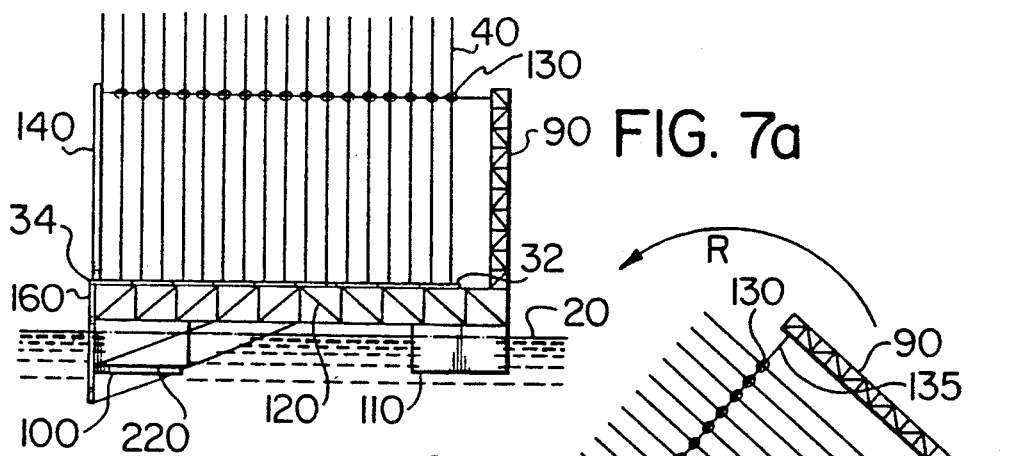
FIG. 7 illustrates, by end views of the forming float device (7a, 7b, 7c, 7d) in accordance with one embodiment of the invention, a counterclockwise 90° rotation of the device and a dock wall section thereon and positioning of the same on a mattress on the sea floor.
Figure 7B:
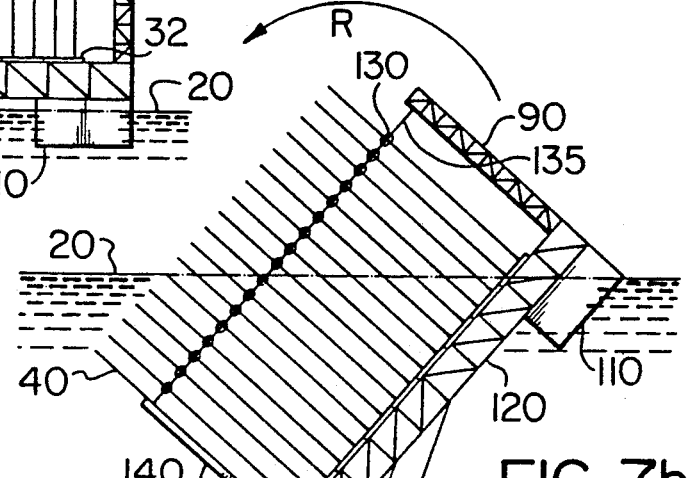
Figure 7C:
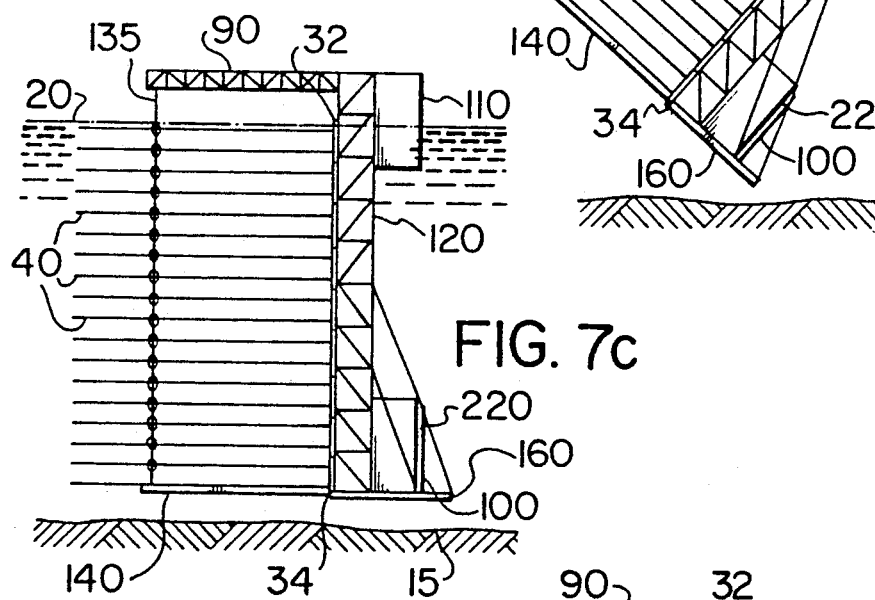
Figure 7D:
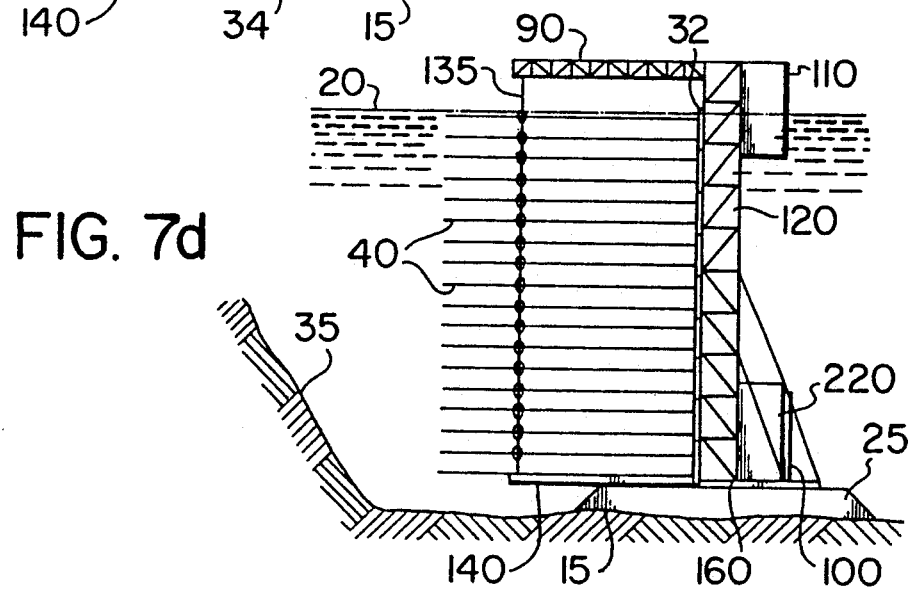

The float device is then manoeuvred so as to position it over a prepared mattress 25 and it is lowered onto the mattress 25 by further flooding the ballast floats (tanks) 110, 220, as shown in FIG. 7d, (or by letting it lower with an ebbing tide, for example), so that the foot 160, the wall section 10 and a portion of the disposable masts 140 rest on the mattress 25. This final rest position (per FIG. 7d) is the position of the wall 8. The weight of the flooded ballast floats 110, 220 holds the float device in position (the floats are flooded sufficiently to ensure that this is true).

Figure 8:
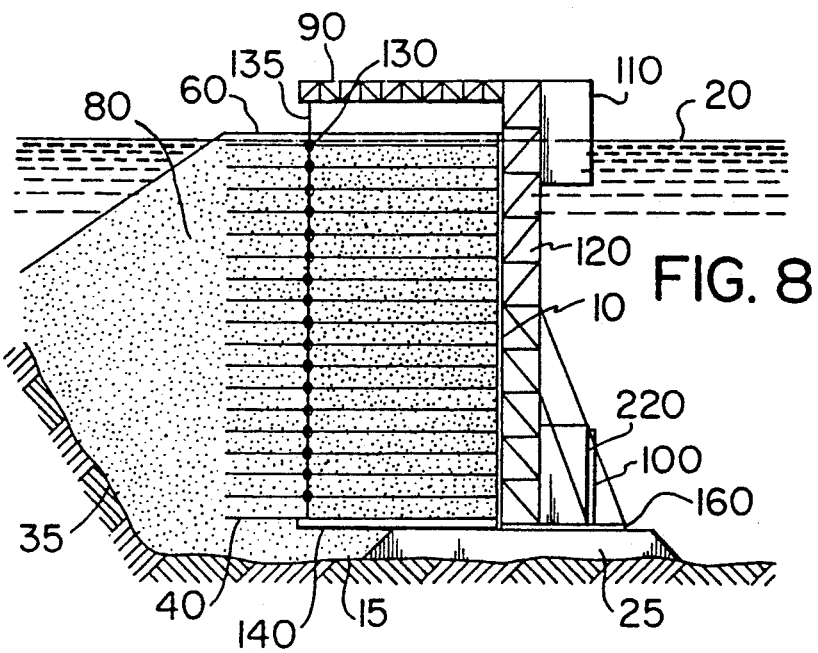
FIG. 8 is an end view of the forming float device according to one embodiment of the invention, in position according to FIG. 7d, illustrating the placement of backfill.

Next, the area between the shoreline 35 and the wall section 10 is filled with appropriate backfill 80 to cause tension in the earth reinforcing strips 40 (so as to maintain wall pieces 5 in position) and to create a dock platform 60 (see FIG. 8). The backfill 80 is placed behind each wall section 8 by pushing fill down the slope of the previously positioned backfill (i.e. for the previously installed wall section 10) such that the fill is placed in the direction of construction towards the length of the earth reinforcing strips; by doing so the backfill 80 is gradually and carefully placed into position and surrounds the earth reinforcing strips 40, as required, without displacing the positions of those earth reinforcing strips. (Any significant degree of displacement of the earth reinforcing strips 40 would reduce the retaining forces of those earth reinforcing strips on the wall pieces 5 and would, therefore, result in a weaker wall 8.) The edges 50 of the wall sections 10, 22, 28 are sloped so as to coincide with the angle of repose of the backfill 80 as each wall section is installed, the slope being 1½ units horizontal to 1 unit vertical.

Following the placement of backfill 80 behind the wall section 10 the float device is removed (see FIG. 9) from the wall section 10 (which is now being held secure by the tensioned earth reinforcing strips 40 and no longer needs to be secured by the float device). The fastening means holding the wall pieces 5 to the deck 120 are removed (as well as any fastening means holding disposable masts 140 to deck 120) and the steel line 135 is cut so that the float device is freed from the wall section 10. The permanent masts 90 are attached to the deck 120 and are removed with the float device but the disposable masts 140 remain embedded in the landfill behind the installed wall section. The disposable mast 140 is a steel structure of lesser strength than the steel mast 90 since it does not hold the load of the earth reinforcing strips 40 when it is rotated to a horizontal position during the positioning of the wall section. The disposable steel mast 140 is either held to a wall piece which is held to the forming deck by fastening means or held directly to the forming deck by similar fastening means. When backfilling is complete the embedded disposable steel masts 140 are released (unfastened) from the float device along with the wall pieces 5. The forming device is then made slightly buoyant by pumping water from its ballast floats (tanks) (110, 220) and moved clear of the wall while it is in its vertical position. The forming float device is then rotated to its original orientation and refloated to the surface of the water by the ballasting means (i.e. the floats 110, 220 are pumped to provide buoyancy and swing the device to its horizontal position) in conventional manner.

Each successive wall section 10, 28 is installed in like manner to the foregoing such that each successive wall section 10, 28 is positioned on a mattress 25 over the floor 15 of the body of water adjacent to the previously placed section, in the direction of construction, the downwardly sloping side 50 of the previously placed section (i.e. the upperside sloping edge) being aligned with the downwardly sloping side 52 of the successive wall section which is opposite the direction of construction (i.e. the underside sloping edge).

SECOND EMBODIMENT (FIGS. 10 TO 20)

According to a second embodiment of the invention rectangular wall pieces and wall sections 5, 300 may be installed, thereby reducing the amount of surface area required of the forming deck. According to this embodiment it is necessary, though, that all of the backfill placed behind each wall section be contained within the bounds of the vertical sides of the sections so that subsequent adjacent sections may be installed. (By contrast, in the first embodiment the backfill is free to settle at a natural angle of repose and sloping sides are provided for the wall sections, the slope conforming to the angle of repose of the backfill.)

Figure 10:
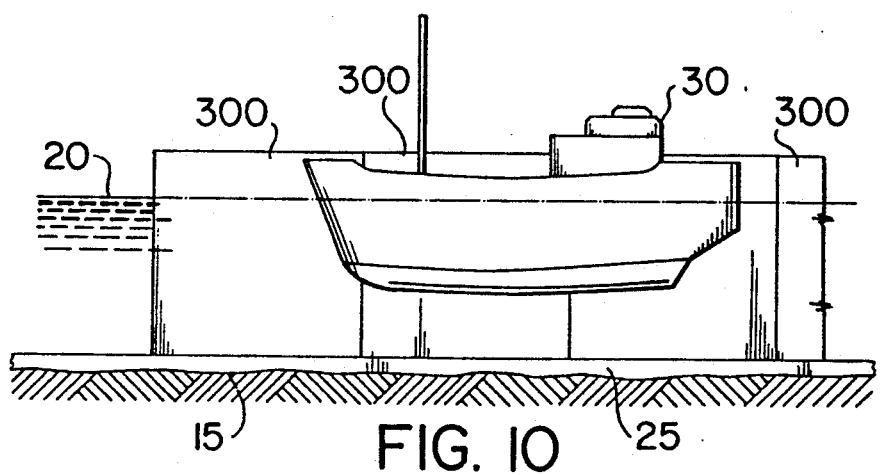
FIG. 10 is a front view of a dock wall which has been constructed in accordance with a second embodiment of the invention (and also illustrates a mattress below the wall and a ship adjacent the water-side of the wall)
Figure 11:
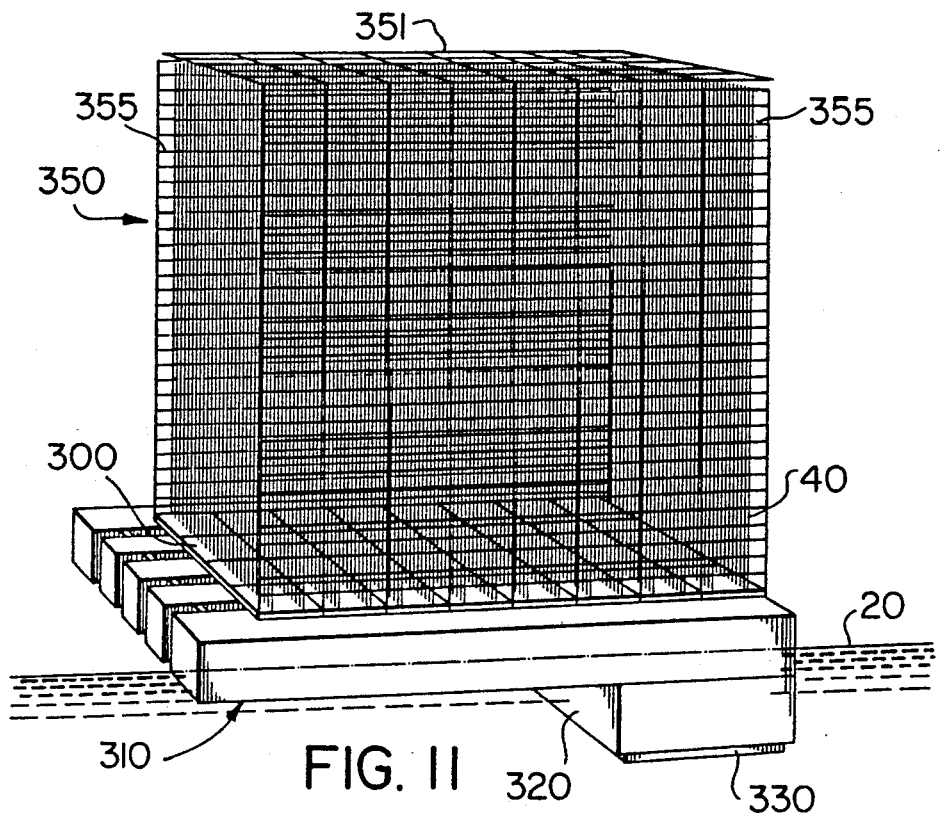
FIG. 11 is a perspective view of a forming float device and dock wall section thereon according to a second embodiment of the invention (and also showing reinforcing strips extending from the wall pieces), the device floating horizontally on the water.
Figure 12:
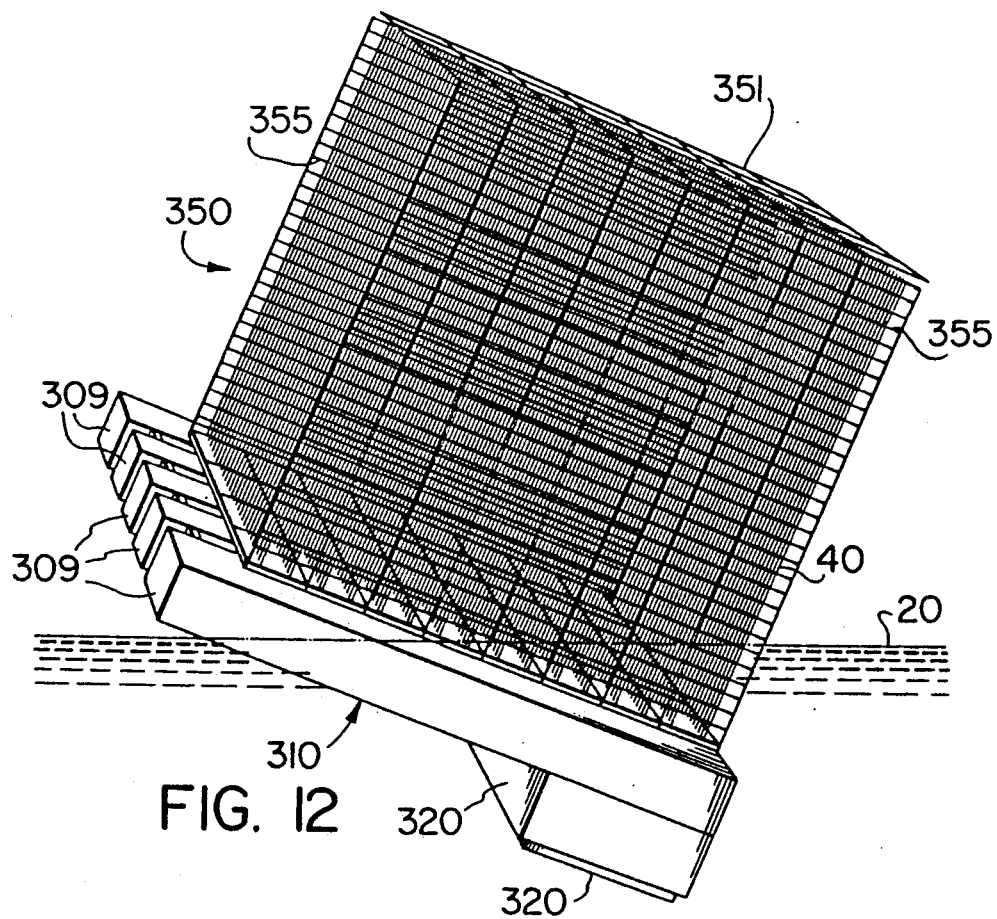
FIG. 12 is a perspective view of the device of FIG. 11 whereby the device has started to rotate counterclockwise.
Figure 13:
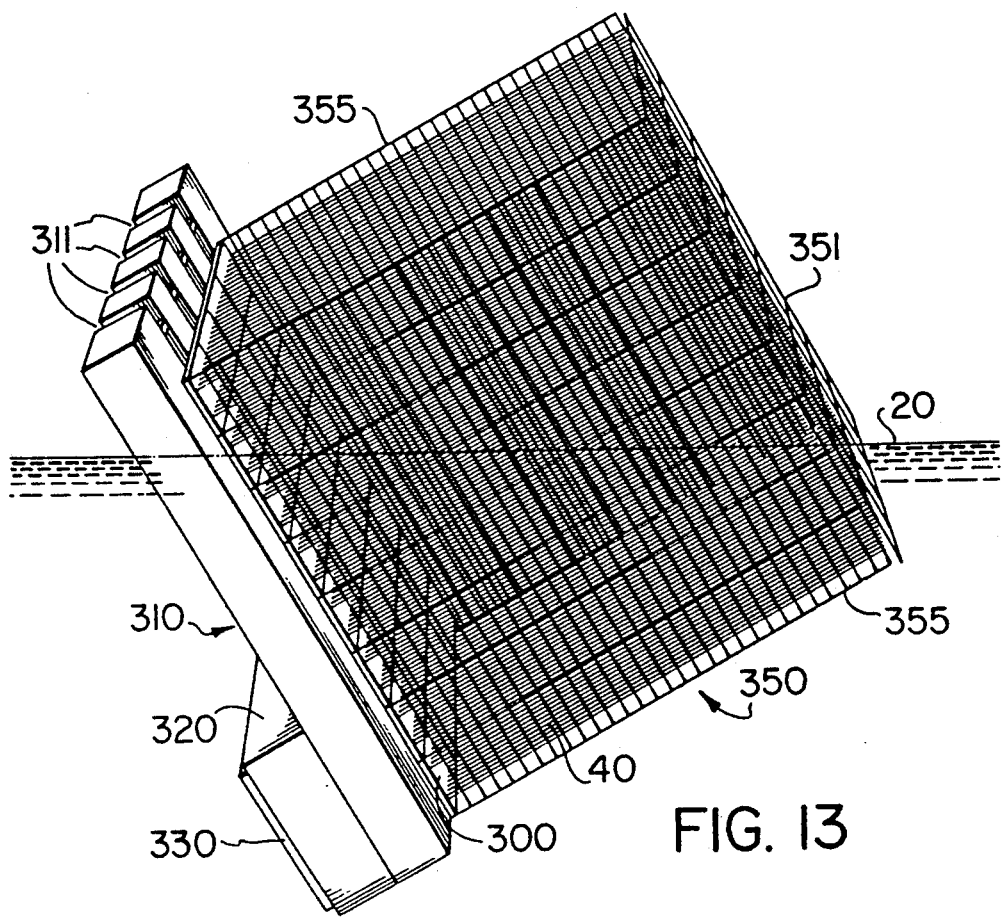
FIG. 13 is a perspective view of the device of FIG. 12 whereby the device has further rotated counterclockwise.

FIG. 10 of the drawings shows a front view of a dock wall according to this embodiment. Wall sections 300 are rectangular and closely aligned one beside another. The wall sections 300 are comprised of a plurality of rectangular shaped wall pieces 5. FIGS. 11 to 14 are perspective views of a forming deck 310 undergoing a 90° rotation in the water so that the wall section 300 thereon changes from being horizontal to vertical. This rotation, as well as the positioning of the wall section 300, is achieved in like manner to that described above with respect to the first embodiment using forming deck 310 consisting of a ballast float 320, counterweight 330, and several deck floats 309. In this embodiment the overall forming deck structure 310 is configured of the two types of floats fastened together to form a rigid floating structure. The ballast float 320 with the counterweight 330 fastened to its underside (when the forming float is horizontal) has attached to its upper surface and at right angles to the longitudinal axis of the ballast float a series of five deck floats 309 which are rigidly fastened to the ballast float 320 and spaced evenly along the top surface of the ballast float (when it is in the horizontal position) leaving four spaces 311 (see FIG. 17a) running the full length and depth of the five deck floats 309. The top surfaces 312 of the deck floats 309 constitute the forming deck on which the rectangular shaped wall pieces 5 are then placed in a horizontal position.

Several rectangular pieces 5 comprise the wall section 300 and are partly suspended over the spaces 311 at the centre of each wall piece 5. Fastening brackets 314 are fastened between the adjacent sides of the deck floats 309 at the top of them and flush with the top of the forming deck 312. One fastening bracket 314 is provided for each rectangular wall piece 5 in order that each wall piece 5 may be fastened individually to the deck floats 309. The wall pieces 5 are fastened to the fastening brackets 314 by means of removable pins 317 that are disengaged by remote means at the time the forming float is to be released from the completed wall section, after it has been rotated to the vertical, placed and backfilled. The spaces 311 provide access to the fastening brackets 314 and allow the wall pieces 5 to be fastened to them by the pins 317.

Figure 14:
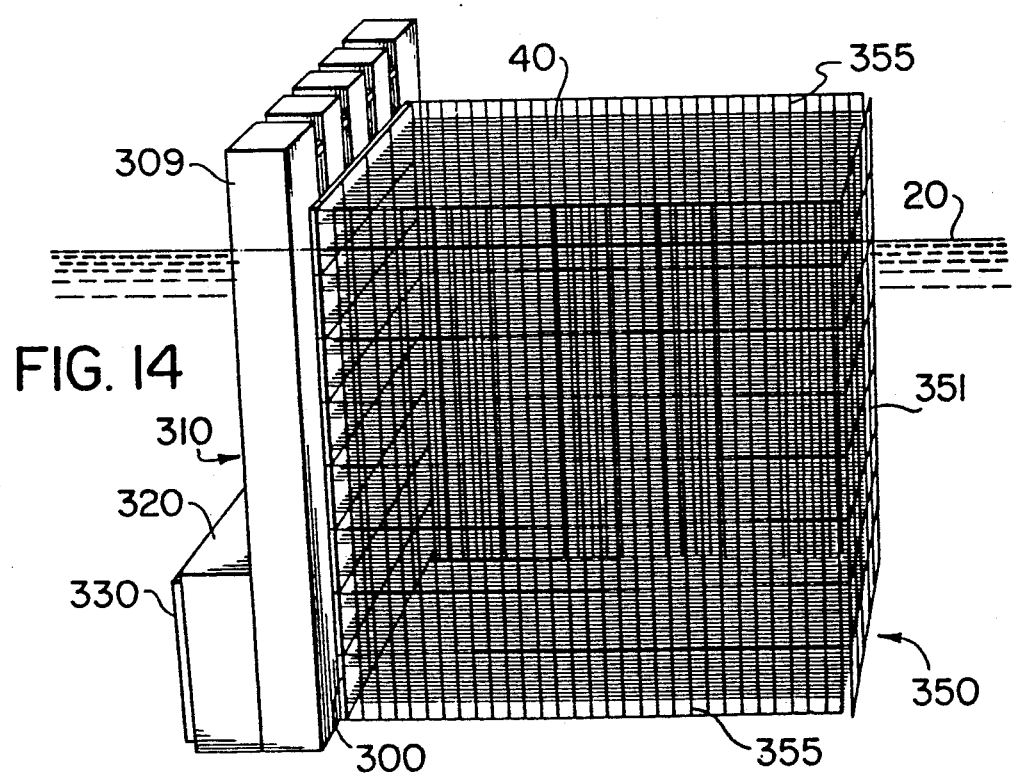
FIG. 14 is a perspective view of the device of FIG. 13 whereby the device has finished rotating such that the dock wall section thereon is vertically oriented over the seabed.
Figure 15:
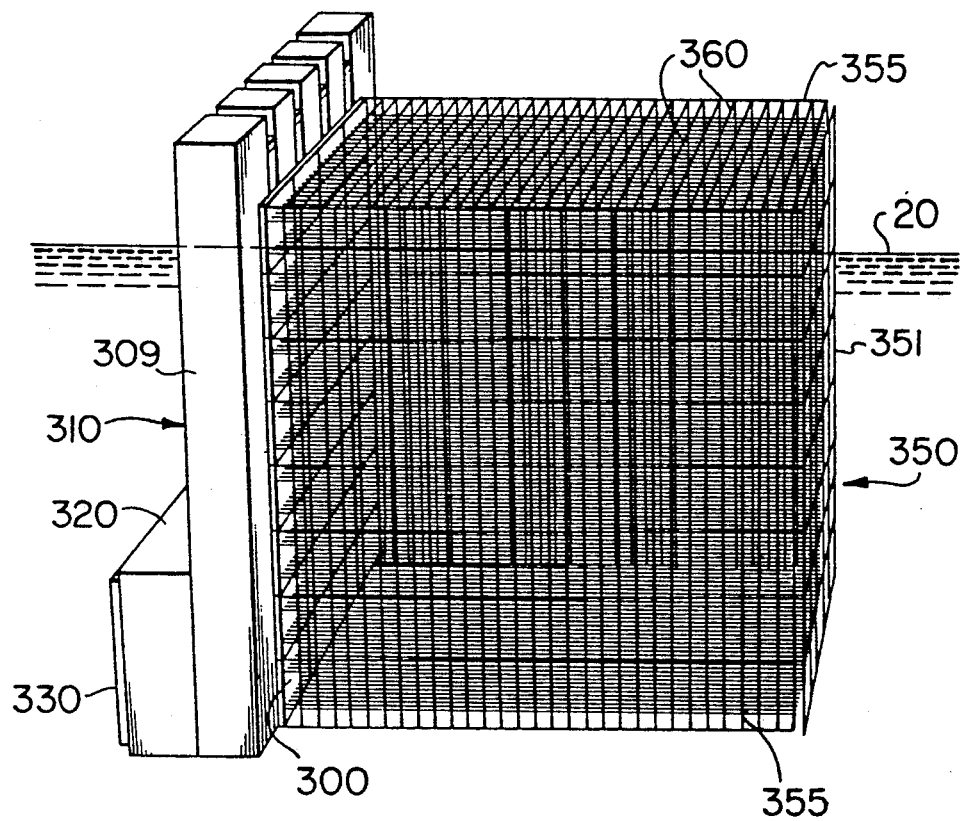
FIG. 15 is a perspective view of a forming float device and dock wall section thereon according to a second embodiment of the invention whereby the means to secure the reinforcing strips (a wire fabric cage) is shown and the device (and attached wall) are in a vertical position over the seabed.
Figure 16:
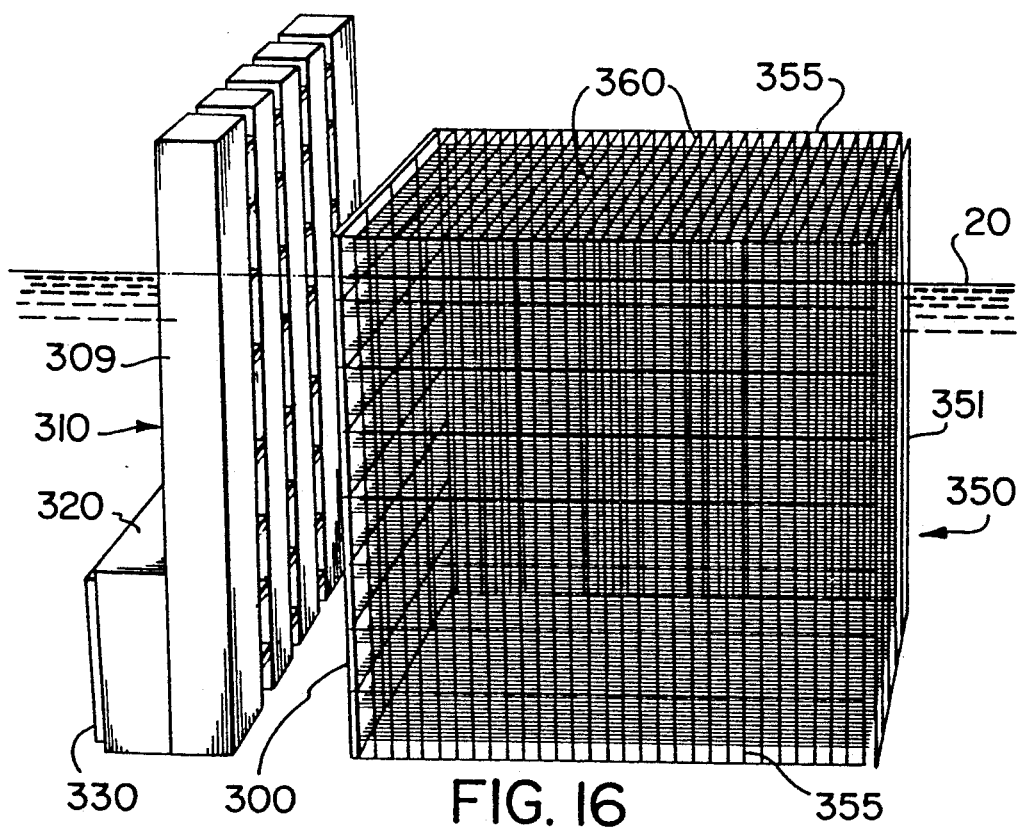
FIG. 16 is a perspective view of the forming float device and dock wall section of FIG. 15 but with the device removed from the wall section.
Figure 17A:
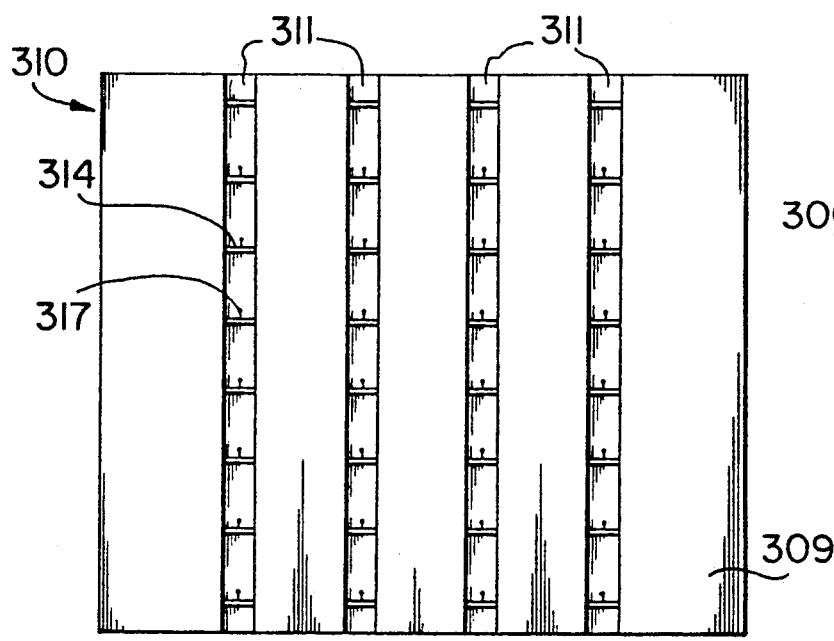
FIG. 17a is a front view of the forming float device according to a second embodiment of the invention (not showing the wall section thereon) and, FIGS. 17b and 17c are the side view and front end view thereof, respectively, showing a wall section thereon, a ballast float (tank) and a counterweight.
Figure 17B:
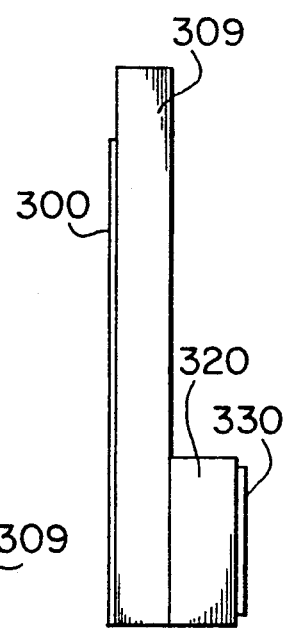
Figure 17C:
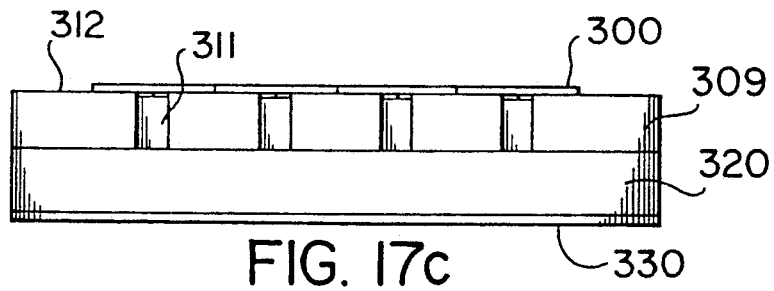
Figure 18:
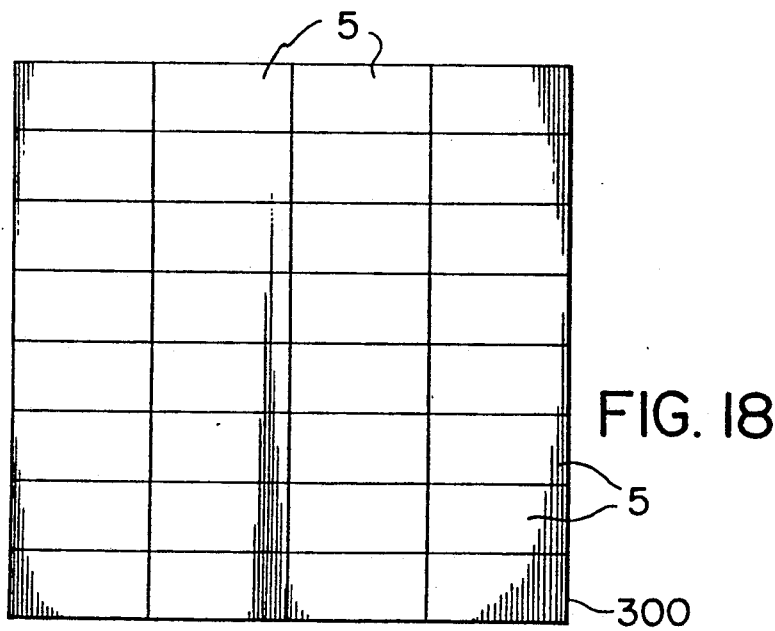
FIG. 18 is a front view of a section of a dock wall in accordance with a second embodiment of the invention.

After the rectangular shaped wall pieces 5 have been placed and fastened to the forming deck 310, the earth reinforcing strips 40 are then placed vertically in the wall pieces 5 as described in the first embodiment. As the backfill placed behind each wall section 300 is to be contained within the bounds of the vertical sides, provision is made for this containment by false walls as shown in FIGS. 11-14. The three walls comprise the back wall 351 which is installed horizontally at the upper end of the vertical earth reinforcing strips 40 and fastened to them, and the two side walls 355 that are installed in a vertical position on each of the sides of the wall section 300. All three of these false walls are vertical when the forming deck 310 is rotated to its perpendicular position (FIG. 14). In that position, the backwall 351 is held vertical and stable by reason that it is connected to the vertical earth reinforcing strips 40. The side walls 355 are held vertical and stable in both the horizontal and perpendicular position by means of steel retaining rods 360 installed there between. The false walls are referred to as such as they need only retain the backfill placed in them for the period during which the backfill is placed (the placing of the backfill being done by means of chutes and vertical transfer pipes so as to place the backfill in uniform layers).

Figure 19:
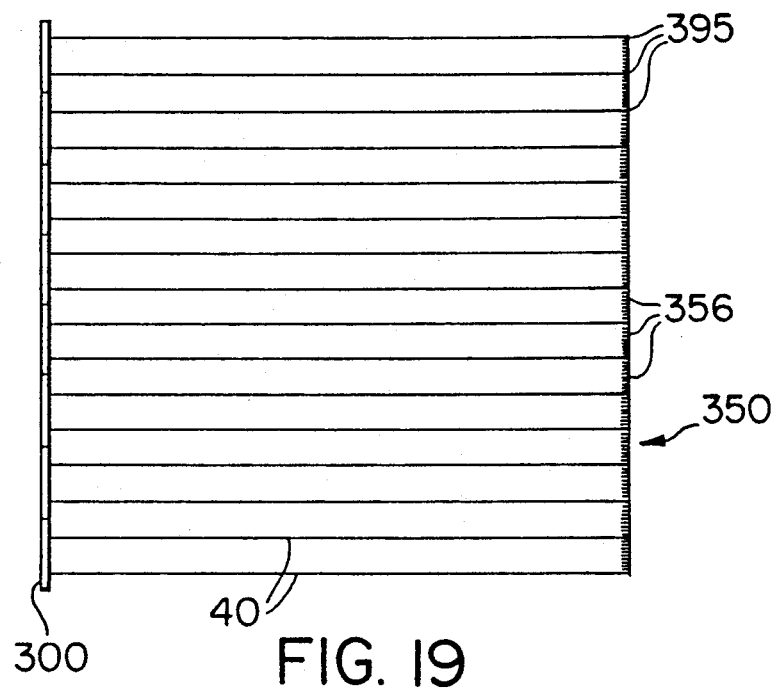
FIG. 19 is a side view of a wall section in accordance with a second embodiment of the invention also showing earth reinforcing strips extending from the wall pieces thereof and a false wall section, securing the ends of the strips.
Figure 20:
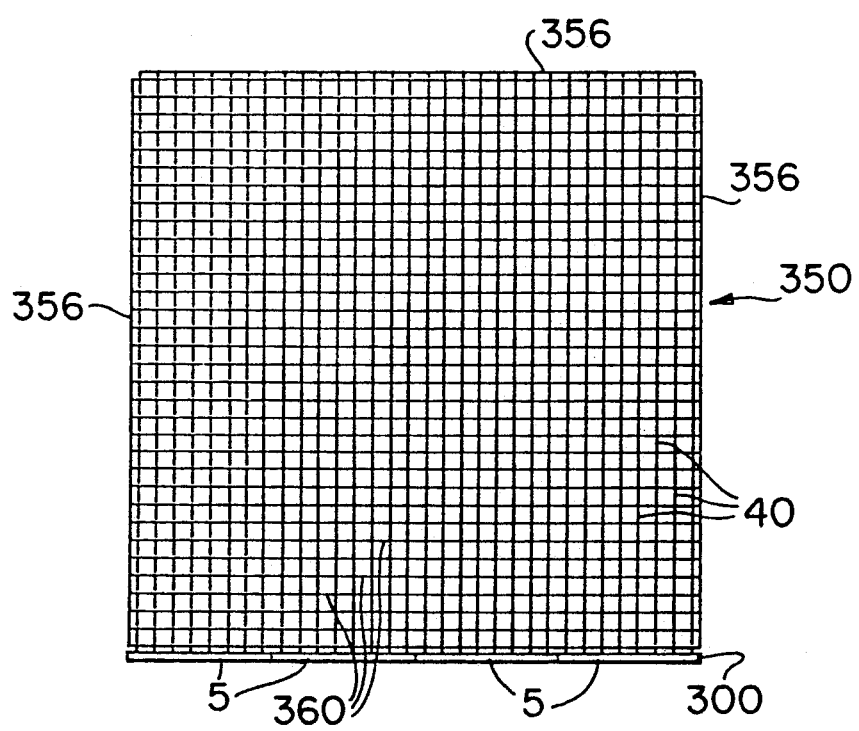
FIG. 20 is a top view of a dock wall section with earth reinforcing strips extending therefrom, also showing steel retaining rods to secure the side false walls against the weight of the backfill material; and, FIGS. 21a–21e illustrate a third embodiment of the invention, the figures showing a perspective view of a forming float device and dock wall section thereon to be installed using circular cylinders, the figures illustrating the rotation of the device to vertically position the wall section.
Figure 21A:
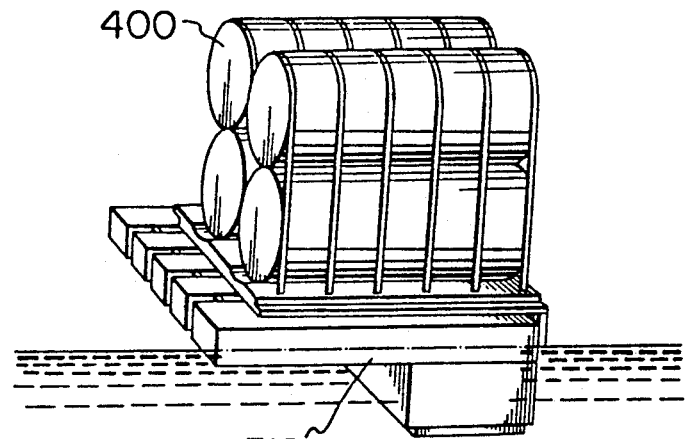
Figure 21B:
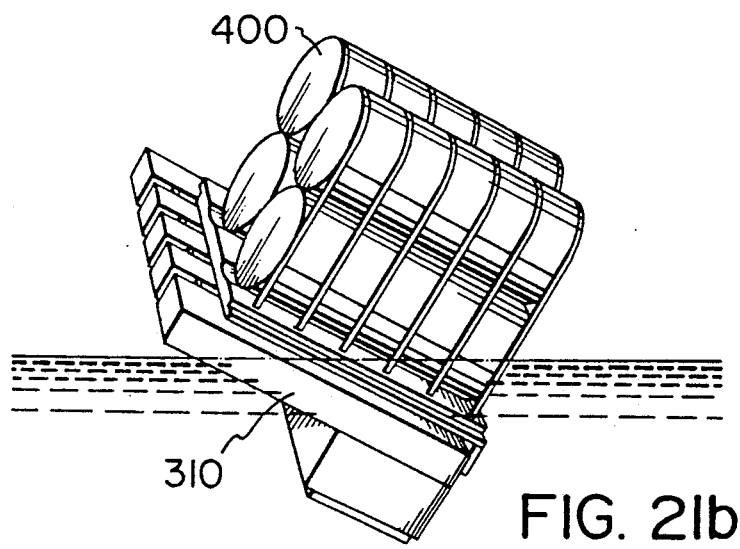
Figure 21C:
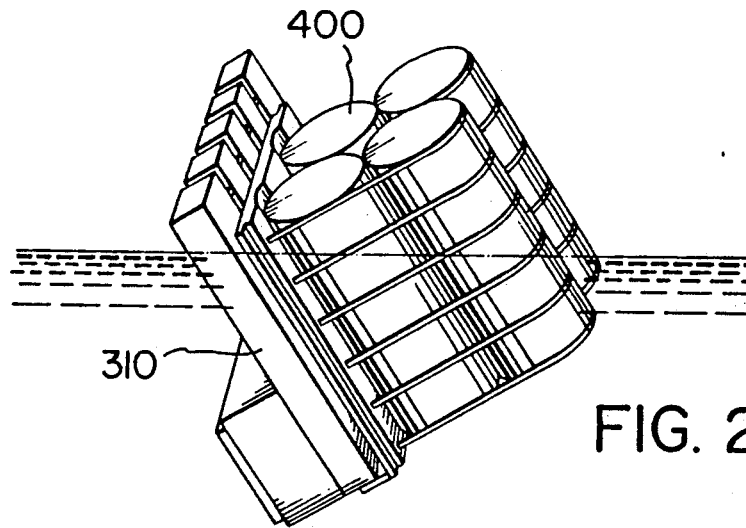
Figure 2I:
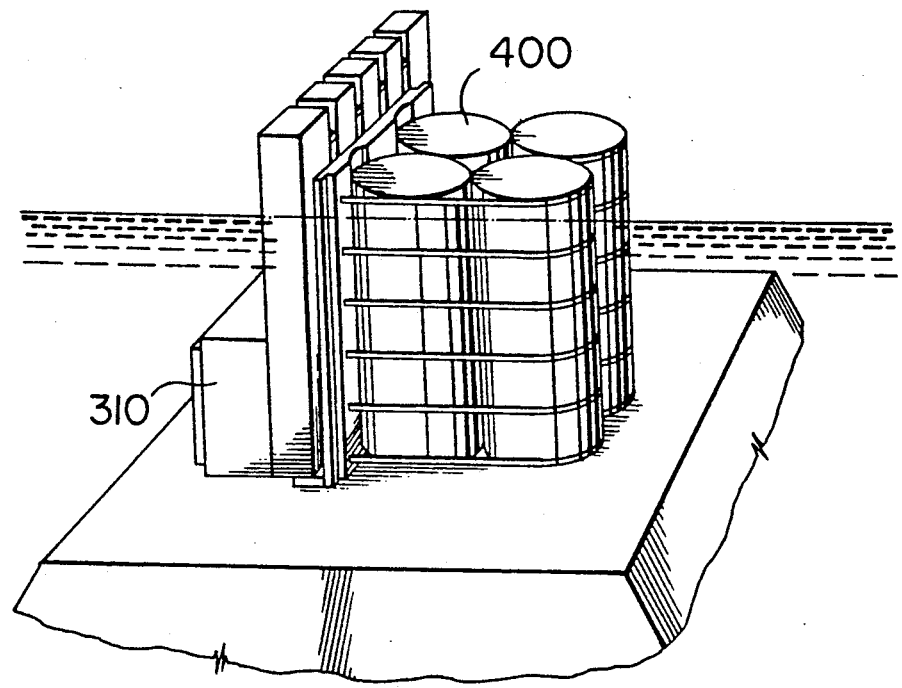
Figure 2I:
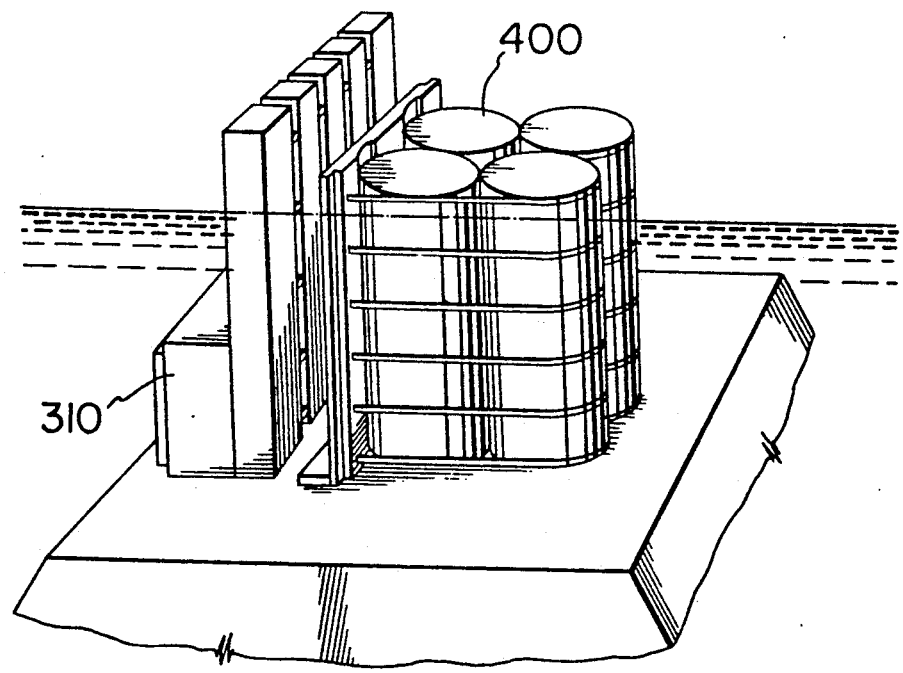

FIGS. 19 and 20 illustrate the construction of the false walls 351, 355 and steel retaining rods 360 to form a cage 350. The earth reinforcing strips 40 that extend from the wall pieces 5 to the back wall 351 and the steel retaining rods 360 that extend from one side wall 355 to the opposite side wall 355 are fastened at their intersection with each other to form a rigid cage 350 that remains stable while it is being constructed, rotated, placed in its final perpendicular position on the mattress, and then filled with backfill material and rendered stable and immoveable.

The back and side walls 351, 355 of the cage 350 consist of a plurality of false wall rectangular sections 356 made up of steel wire fabric fastened to the ends of either the earth reinforcing strips 40 or the steel retaining rods 360 by means of flat steel bars or stirrups 395 passed outside and against the outer surface of the false wall sections 356. The stirrups 395 fasten the false wall sections 356 to the steel cage 350 through the earth reinforcing strips or the steel retaining rods.

In its perpendicular position the wall section 300 contains the backfill on the front by the wall pieces on the sides by the side walls, on the back by the back wall and on the bottom by the mattress. The top surface of the cage 350 is open.

Not shown in the drawings is a jute or geotextile material covering which is placed on the inner surface of the steel wire fabric comprising the false wall sections 356 to provide additional retention of backfill within the false wall sections. The jute is used to provide a temporary barrier only—it is intended to disintegrate over time after the desired wall sections 300 have been installed and force is no longer required to confine the backfill to the area of the cage 350. Similarly, the steel material used for the steel retaining rods 360, the false wall sections 356, and the stirrups 395 need not be of the strength or quality of that required for the reinforcing strips 40 since tension will be held by those rods and false wall pieces only during the relatively short period of installation of the wall section 300. Thus the cost of constructing the required cages 350 associated with this embodiment may be expected to be less than the counterpart costs of the larger forming deck, masts, etc. associated with the first embodiment described above.

In accordance with this embodiment the attachment of the wall pieces 5 to the forming deck 310, the positioning of the forming deck 310 during the installation of the wall section 300 and the release of the forming deck 310 from the combination of the wall sections 300 and wire fabric cage 350 are achieved in like manner to those steps described above with respect to the first embodiment.

Figure 9:
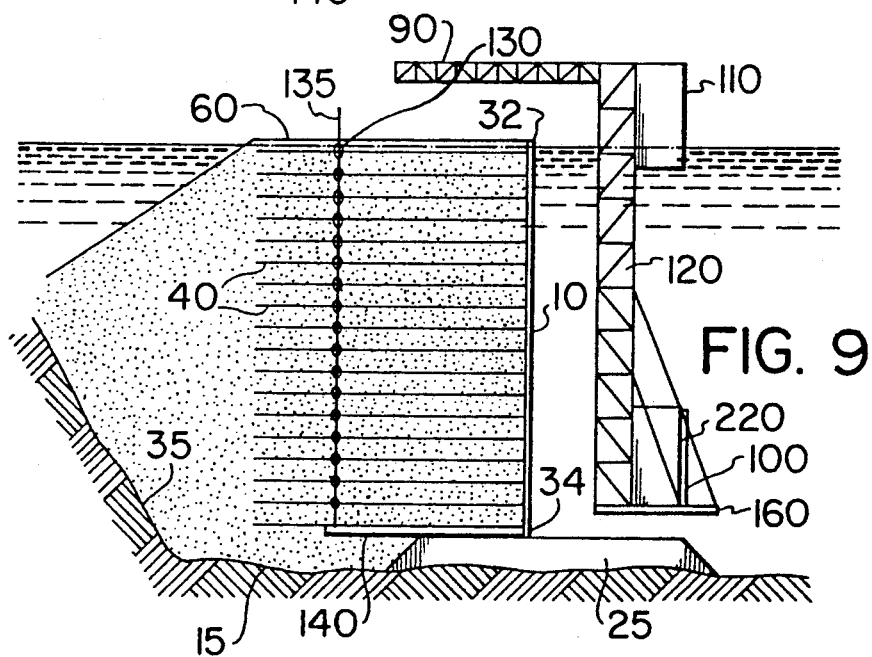
FIG. 9 is an end view of the forming float device according to one embodiment of the invention (following the placement of backfill per FIG. 8), illustrating the release and refloating of the device.

The next and subsequent wall sections 300 are installed, and the area between the installed wall sections and the shoreline is filled as shown in FIGS. 8, 9.

THIRD EMBODIMENT (FIGS. 21a TO 21e)

According to a third embodiment of the invention the rectangular wall pieces 5 and wall sections 300 may also be installed in accordance with the above-described second embodiment except that the backfill placed behind each wall section is contained within a bundle of containers providing vertical barriers, specifically by means of a series of vertical circular cylinders 400 attached together and to the wall section. The vertical circular cylinders 400 replace the earth reinforcing strips 40 as the means to retain the wall section. When all circular cylinders are filled with backfill material, their collective weight renders them stable to resist the pressure of the backfill between the dock structure and the shoreline and the weights of the vertical loads imposed on the horizontal surface by its use.

The cylindrical containers 400 are installed on the top of the wall section with their axes horizontal such that they are caused to rotate to a vertical position, with their longitudinal axes vertical, when the float device is rotated 90 degrees. The cylinder surfaces are parallel to each other and the cylinders are placed in a grouping, for example of four cylinders, to form a bundle of cylinders (containers) whereby each cylinder is in contact with the adjacent cylinders at its quarter lines adjacent those cylinders. Together the bundle of cylinders forms a generally rectangular parallelepiped shape whose height is the height of the wall with a width slightly less than the horizontal width of the wall section and whose depth is approximately 75 to 80 percent of the wall height.

The vertical circular cylinders are extremely structurally efficient as all containment forces caused by the backfill are pure horizontal tension forces occurring in the material comprising the cylinders. The material can be either steel, fibreglass or other synthetic fabrics or fibres that only need have a high tensile strength as their form and structure embodying the vertical cylinders is first supported temporarily by the forming deck, and then permanently supported by the backfill material placed within them and without them.

In this embodiment the concrete wall pieces 5 that comprise the vertical wall section 300 serve to armour the face of the seawall or dock against damage from ship impacts or like mishaps. The method of construction is inherently safe as a major impact that could penetrate the concrete wall section may only pierce one or two vertical or circular cylinders causing them to lose backfill material and become unstable. The remaining vertical circular cylinders remaining intact would still be stable and are able to sustain the remainder of the dock structure until repairs could be made.

Alternatively to installing a plurality of wall pieces 5, a unitary wall section may be used in this embodiment. Accordingly, a complete wall section would be constructed on the forming deck of a material such as reinforced concrete or similar material. The wall section would then be attached to the top surface of the forming deck in such a manner that it may be released, as a whole, remote from that top surface.

What is claimed is:

1. A method of making a dock or sea wall using a forming float device comprising a forming deck and ballasting means therebelow whereby said device is floated in a body of water a selected distance from the shoreline, said method comprising the steps:
   (a) forming a first wall section on the top surface of said forming deck such that said first wall section rests horizontally on the surface of said deck, said first wall section being of a shape to provide a horizontal bottom surface and sloping side surfaces whereby the side to be positioned closest to the direction of construction slopes downwardly in the direction of construction and the opposite side slopes upwardly in the direction of construction, the angle of said sloping being predetermined in relation to the angle of repose of backfill to be placed between the wall section (when it has been finally positioned) and the shoreline, said wall section comprising a plurality of wall pieces whereby said wall pieces are aligned and of an appropriate shape to together provide a uniform wall section and each said wall piece is fastened by fastening means to the top surface of said forming deck in such manner as to permit limited movement of said wall pieces in a plane perpendicular to the plane of said forming deck and such that said fasteners may be removed remote from the top surface of said forming deck;
   (b) installing earth reinforcing strips in said wall pieces whereby said earth reinforcing strips extend upwardly from said wall pieces generally perpendicular to the planes defined by said wall section and forming deck, the length of said earth reinforcing strips having been appropriately selected according to the height of said dock or sea wall being made and said earth reinforcing strips being secured in said upward generally perpendicular position;
   (c) rotating said forming float device by means of said ballasting means whereby said wall section assumes a generally perpendicular position;
   (d) positioning said forming float device with said generally perpendicular wall section on a preselected generally level surface of the floor of said body of water;
   (e) placing backfill between said shoreline and said wall section such that said earth reinforcing strips and wall pieces are made to stabilize and maintain position;
   (f) removing said forming float device from said wall section;
   (g) rotating said forming float device to its original orientation and refloating said device to the surface of said water by means of said ballasting means; and,
   (h) optionally, repeating the foregoing steps for each successive wall section to comprise said dock or sea wall, if any, but whereby each said successive wall section is shaped to provide horizontal top and bottom surfaces and sloping side surfaces whereby each said side surface slopes downwardly in the direction of construction and the angle of the slope is the same as that of the side of said first wall section which is nearest the direction of construction;
   whereby each successive wall section, if any, is positioned on the floor of said body of water adjacent to the previously placed section in the direction of construction and said downwardly sloping side of the previously placed section is aligned with the downwardly sloping side of the successive wall section which is furthest from the direction of construction.

2. The method of claim 1 whereby a mattress is positioned on said floor of said body of water and said wall section is positioned on said mattress.

3. The method of claim 2 whereby said first wall section is of a triangular shape.

4. The method of claim 2 whereby said angle of said sloping sides of said successive wall sections and said side of said first wall section nearest to the direction of construction is 1½ units horizontal to 1 unit vertical.

5. Apparatus for making a dock or sea wall comprising a forming float device which is floatable on a body of water, said device comprising:
(a) a forming deck providing a generally horizontal surface for forming and holding thereupon a wall section comprised of a plurality of wall pieces and at least one earth reinforcing strip attached to and extending from each said piece;
(b) means for fastening said plurality of wall pieces to the top surface of said forming deck in such manner as to permit limited movement of said wall pieces in a plane perpendicular to the plane of said forming deck and such that said fasteners may be removed remote from the top surface of said forming deck;
(c) means for securing said earth reinforcing strips in an upward, generally perpendicular, position relative to said wall pieces and forming deck;
(d) means for rotating said forming float device approximately 90 degrees;
(e) means for positioning said forming float device over or on a pre-selected location of the floor of said body of water; and,
(f) means for refloating said forming float device on said body of water from said position over or on a pre-selected location of the floor of said body of water.

6. Apparatus according to claim 5 wherein said means for rotating, positioning and refloating said forming float device comprises means for ballasting said forming float device.

7. Apparatus according to claim 6 wherein said securing means comprises a plurality of holding masts at opposite sides of said forming deck such that said masts at one side may be rotated to a horizontal position above said earth reinforcing strips upon a 90° rotation of said forming float device.

8. A method of making a dock or sea wall using a forming float device comprising a forming deck and ballasting means therebelow whereby said device is floated in a body of water a selected distance from the shoreline, said method comprising the steps:
(a) forming a first wall section on the top surface of said forming deck such that said first wall section rests horizontally on the surface of said deck, said first wall section being of a shape to provide a horizontal bottom surface and generally vertical side surfaces, said wall section comprising a plurality of wall pieces whereby said wall pieces are aligned and of an appropriate shape to together provide said wall section and each said wall piece is fastened by fastening means to the top surface of said forming deck in such manner as to permit limited movement of said wall pieces in a plane perpendicular to the plane of said forming deck and such that said fasteners may be removed remote from the top surface of said forming deck;
(b) installing earth reinforcing strips in said wall pieces whereby said earth reinforcing strips extend upwardly from said wall pieces generally perpendicular to the planes defined by said wall section and forming deck, the length of said earth reinforcing strips having been appropriately selected according to the height of said dock or sea wall being made;
(c) securing said earth reinforcing strips in said upward generally perpendicular position;
(d) rotating said forming float device by means of said ballasting means whereby said wall section assumes a generally perpendicular position;
(e) positioning said forming float device with said generally perpendicular wall section on a pre-selected generally level surface of the floor of said body of water;
(f) placing backfill between said shoreline and said wall section such that said earth reinforcing strips and wall pieces are made to stabilize and maintain position;
(g) removing said forming float device from said wall section;
(h) rotating said forming float device to its original orientation and refloating said device to the surface of said water by means of said ballasting means; and,
(i) optionally, repeating the foregoing steps for each successive wall section to comprise said dock or sea wall, if any, whereby each said successive wall section is shaped to provide a horizontal bottom surface and generally vertical side surfaces;
whereby each successive wall section, if any, is positioned on the floor of said body of water adjacent to the previously placed section.

9. The method of claim 8 whereby a mattress is positioned on said floor of said body of water and said wall section is positioned on said mattress.

10. The method of claim 9 whereby said wall sections are of a rectangular shape.

11. The method of claim 8 whereby said wall sections are of a rectangular shape.

12. The method of claim 11 whereby said reinforcing strips are secured by means of a rectangular framework adjacent said wall section, comprising two side walls and a backwall, said side walls and backwall comprising a plurality of false wall sections attached to said earth reinforcing strips or steel retaining rods positioned perpendicular thereto to form a cage for retaining said backfill.

13. Apparatus for making a dock or sea wall comprising a forming float device which is floatable on a body of water, said device comprising:
(a) a forming deck providing a generally horizontal surface for forming and holding thereupon a wall section comprised of a plurality of wall pieces and at least one earth reinforcing strip attached to and extending from each said piece;
(b) means for fastening said plurality of wall pieces to the top surface of said forming deck in such manner as to permit limited movement of said wall pieces in a plane perpendicular to the plane of said forming deck and such that said fasteners may be removed remote from the top surface of said forming deck;
(c) means for securing said earth reinforcing strips in an upward, generally perpendicular, position relative to said wall pieces and forming deck;
(d) means for rotating said forming float device approximately 90 degrees;
(e) means for positioning said forming float device over or on a pre-selected location of the floor of said body of water; and,
(f) means for refloating said forming float device on said body of water from said position over or on a pre-selected location of the floor of said body of water.

14. Apparatus according to claim 13 wherein said means for rotating, positioning and refloating said forming float device comprises means for ballasting said forming float device.

15. Apparatus according to claim 14 wherein said securing means comprises a cage, said cage comprising a backwall and two side walls each comprising a plurality of false wall sections attached to said earth reinforcing strips or to steel retaining rods positioned perpendicular to said strips and between said side walls.

16. A method of making a dock or sea wall using a forming float device comprising a forming deck and ballasting means therebelow whereby said device is floated in a body of water a selected distance form the shoreline, said method comprising the steps:
   (a) forming a first wall section on the top surface of said forming deck such that said first wall section rests horizontally on the surface of said deck, said first wall section being of a shape to provide a horizontal bottom surface and generally vertical side surfaces, said wall section comprising a plurality of wall pieces whereby said wall pieces are aligned and of an appropriate shape to together provide said wall section and each said wall piece is fastened by fastening means to the top surface of said forming deck in such manner as to permit limited movement of said wall pieces in a plane perpendicular to the plane of said forming deck and such that said fasteners may be removed remote from the top surface of said forming deck;
   (b) attaching a bundle of containers adjacent said wall section whereby the walls of said containers are parallel said wall section and the tops of said containers are open and proximate the top of said wall section;
   (c) rotating said forming float device by means of said ballasting means whereby said wall section and bundle of containers assume a generally perpendicular position;
   (d) positioning said forming float device and said generally perpendicular wall section on a pre-selected location of the floor of said body of water;
   (e) placing backfill between said shoreline and said wall section such that said containers are filled with and surrounded by said backfill such that said wall section is made to stabilize and maintain position;
   (f) removing said forming float device from said wall section;
   (g) rotating said forming float device to its original orientation and refloating said device to the surface of said water by means of said ballasting means; and,
   (h) optionally, repeating the foregoing steps for each successive wall section to comprise said dock or sea wall, if any, whereby each said successive wall section is shaped to provide a horizontal bottom surface and generally vertical side surfaces;
   whereby each successive wall section, if any is positioned on the floor of said body of water adjacent to the previously placed section.

17. The method of claim 16 whereby a mattress is positioned on said floor of said body of water and said wall section is positioned on said mattress.

18. The method of claim 16 whereby said wall sections are of a rectangular shape.

19. The method of claim 18 whereby said containers are cylindrical.

20. Apparatus for making a dock or sea wall comprising a forming float device which is floatable on a body of water, said device comprising:
   (a) a forming deck providing a generally horizontal surface for forming and holding thereupon a wall section comprised of a plurality of wall pieces and a bundle of containers attached thereto;
   (b) means for fastening said plurality of wall pieces to the top surface of said forming deck in such manner as to permit limited movement of said wall pieces in a plane perpendicular to the plane of said forming deck and such that said fasteners may be removed remote from the top surface of said forming deck;
   (c) means for securing said bundle of containers to said wall section;
   (d) means for rotating said forming float device approximately 90 degrees;
   (e) means for positioning said forming float device over or on a pre-selected location of the floor of said body of water; and,
   (f) means for refloating said forming float device on said body of water from said position over or on a pre-selected location of the floor of said body of water.

21. Apparatus according to claim 20 wherein said means for rotating, positioning and refloating said forming float device comprises means for ballasting said forming float device.

22. Apparatus according to claim 21 wherein said containers are circular.

* * * * *

UNITED STATES PATENT AND TRADEMARK OFFICE
CERTIFICATE OF CORRECTION

PATENT NO. : 5,118,222

DATED : June 2, 1992

INVENTOR(S) : John M. Dow

It is certified that error appears in the above-identified patent and that said Letters Patent is hereby corrected as shown below:

In column 1, line 58, please delete "sea wall" and substitute therefor --seawall--.

In column 2, line 24, please delete "sea wall" and substitute therefor --seawall--.

In column 2, line 51, please delete "sea wall" and substitute therefor --seawall--.

In column 3, line 5, please delete "sea wall" and substitute therefor --seawall--.

In column 6, lines 14 and 15, please delete "manoeuvring" and substitute therefor --maneuvering--.

In column 7, line 6, after "bars" please delete ".".

In column 7, line 40, please delete "sea wall" and substitute therefor --seawall--.

In column 7, line 47, please delete "sea wall" and substitute therefor --seawall--.

UNITED STATES PATENT AND TRADEMARK OFFICE
CERTIFICATE OF CORRECTION

PATENT NO. : 5,118,222
DATED : June 2, 1992
INVENTOR(S) : John M. Dow

It is certified that error appears in the above-identified patent and that said Letters Patent is hereby corrected as shown below:

In column 7, line 51, please delete "manoeuvred" and substitute therefor --maneuvered--.

In column 9, line 66, please delete "there between" and substitute therefor --therebetween--.

In Claim 1, line 1, please delete "sea wall" and substitute therefor --seawall--.

In Claim 1, subparagraph (b), line 7, please delete "sea wall" and substitute therefor --seawall--.

In Claim 1, subparagraph (h), line 3, please delete "sea wall" and substitute therefor --seawall--.

In Claim 5, line 1, please delete "sea wall" and substitute therefor --seawall--.

In Claim 8, line 1, please delete "sea wall" and substitute therefor --seawall--.

In Claim 8, subparagraph (b), line 7, please delete "sea wall" and substitute therefor --seawall--.

In Claim 8, subparagraph (i), line 3, please delete "sea wall" and substitute therefor --seawall--.

In Claim 13, line 1, please delete "sea wall" and substitute therefor --seawall--.

UNITED STATES PATENT AND TRADEMARK OFFICE
CERTIFICATE OF CORRECTION

PATENT NO. : 5,118,222
DATED     : June 2, 1992
INVENTOR(S) : John M. Dow

It is certified that error appears in the above-identified patent and that said Letters Patent is hereby corrected as shown below:

In Claim 16, line 1, please delete "sea wall" and substitute therefor --seawall--.

In Claim 16, line 4, please delete "form" and substitute therefor --from--.

In Claim 16, subparagraph (h), line 3, please delete "sea wall" and substitute therefor --seawall--.

In Claim 20, line 1, please delete "sea wall" and substitute therefor --seawall--.

Signed and Sealed this

Fifth Day of April, 1994

Attest:

BRUCE LEHMAN

*Attesting Officer*          *Commissioner of Patents and Trademarks*